Nov. 10, 1970            F. M. HARTZ            3,540,030

STRUCTURE FOR AND METHOD OF POWERLINE LOAD REMOTE CONTROL

Original Filed Dec. 16, 1965            3 Sheets-Sheet 1

*INVENTOR.*
FRANK M. HARTZ

BY *Whittemore,*
*Hulbert & Belknap*
ATTORNEYS

Nov. 10, 1970     F. M. HARTZ     3,540,030
STRUCTURE FOR AND METHOD OF POWERLINE LOAD REMOTE CONTROL
Original Filed Dec. 16, 1965     3 Sheets-Sheet 3
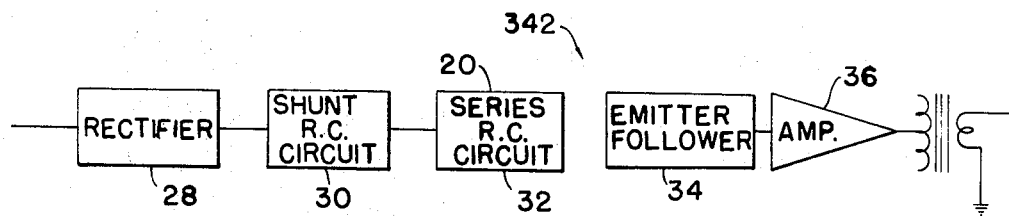
FIG. 6
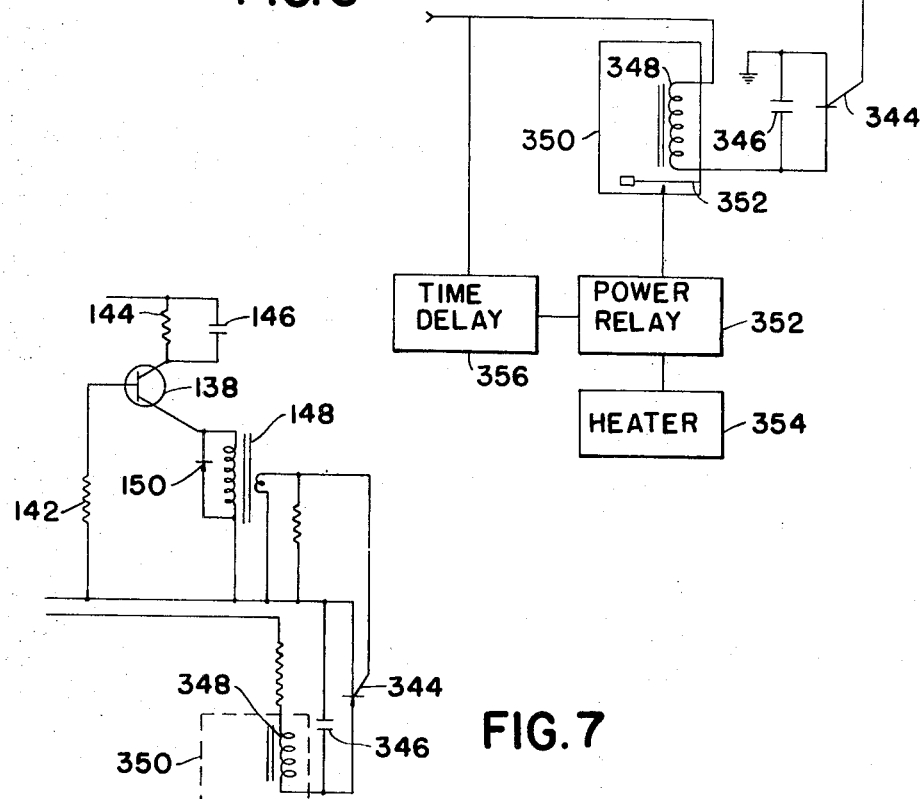
FIG. 7
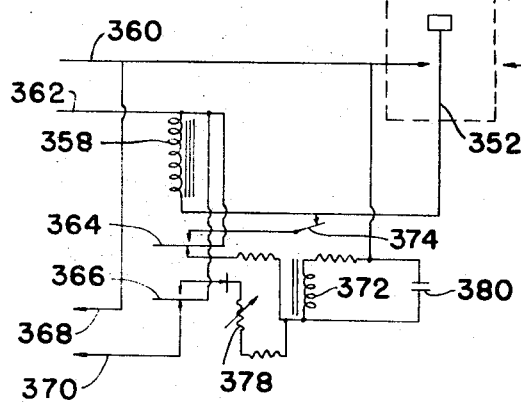
*INVENTOR.*
FRANK M. HARTZ
BY *Whittemore,*
*Hulbert & Belknap*
ATTORNEYS

United States Patent Office 3,540,030
Patented Nov. 10, 1970

3,540,030
STRUCTURE FOR AND METHOD OF POWERLINE LOAD REMOTE CONTROL
Frank M. Hartz, Detroit, Mich., assignor to The Detroit Edison Company, Detroit, Mich., a corporation of New York
Continuation of application Ser. No. 514,188, Dec. 16, 1965. This application Sept. 29, 1969, Ser. No. 863,015
Int. Cl. H02j 13/00
U.S. Cl. 340—310
6 Claims

ABSTRACT OF THE DISCLOSURE

A structure for and method of taking a load off a power distribution system for a predetermined time in response to a signal sensed at a remote location from a power generation location is disclosed. The means for effecting removal of the load from the distribution system is responsive to the full power of the distribution system in accordance with the method disclosed. More specifically structure at the utilizing location for removing the load includes means for counting control signals impressed on an alternating power signal at the power generation location in a predetermined length of time, means for counting the number of cycles of the power signal in the predetermined length of time, means for providing a single output signal only on simultaneous occurrence of a predetermined number of control signals and power signal cycles in the predetermined time and relay means actuated by the entire power signal responsive to the output signal for removing the load from the power distribution system.

---

This is a continuation of application No. 514,188 filed Dec. 16, 1965, now abandoned.

In accordance with the disclosure of the commonly owned copending patent application, Ser. No. 408,301, filed Nov. 2, 1964, the disclosure of which is incorporated herein by reference, it is often desired to take certain electrical load off of a power distribution system for predetermined times. Thus during peak loads and during emergencies, it is for example desirable to provide a way to remove loads, such as hot water heaters, from an electrical distribution system for a short time. Further, it is desirable that the removal of the load from the distribution system be controlled from a central location and that the load be placed back in the system automatically.

Prior structure for accomplishing the removal of a load from the usual distribution system has not been sensitive enough to operate efficiently on the desired level of signal impressed on the power signal from the distribution station. In addition prior structures for taking the load off a distribution system have sometimes been responsive to outside interference, such as stitch welders, which may provide disturbance at particular frequencies on electrical distribution lines.

It is therefore one of the objects of the present invention to provide improved means for removing a load from a power distribution system in response to a control signal from the power distribution system.

Another object is to provide control structure for removing a load from a power distribution system in response to a control signal impressed on the power signal in the system, including means for counting the number of control signals occurring in a predetermined length of time and means responsive to a predetermined count in the predetermined length of time for removing the load from the power distribution system.

Another object is to provide at a utilizing location structure for counting the number of control signals impressed on an alternating power signal in a predetermined length of time, means for counting the number of cycles of a power signal in the predetermined length of time, means for providing a single output signal only on simultaneous occurrence of a predetermined number of control signals and power signal cycles in the predetermined time and means responsive to the output signal for removing the load from the power distribution system.

Another object is to provide an improved method of removing a load from a power distribution system in response to a signal from the system.

Another object is to provide a method of removing a load from a power distribution system comprising counting the number of control signals impressed on a power signal in the system in a predetermined time, counting the number of cycles of the power signal in the predetermined time, and removing the load from the system in response to a simultaneous occurrence of a predetermined number of counts of the control signal and cycles of the power signal in the predetermined time.

Another object is to provide structure for removing a load from a power distribution system at a remote location, including means for sensing control signals impressed on a power signal in the power distribution system, resonant means responsive to the full power from the power distribution system at the frequency of the control signal and means responsive to resonance of the resonant means for removing the load from the system for a predetermined time.

Another object is to provide structure for and a method of removing a load from a power distribution system for a predetermined time in response to a signal from the system which is simple, economical and efficient.

Other objects and features of the invention will become apparent as the description proceeds, especially when taken in conjunction with the accompanying drawings, illustrating a preferred embodiment of the invention, wherein:

FIG. 6 is a partly block and partly schematic diagram of a modification of the control structure illustrated in FIG. 1.

FIG. 7 is a completely schematic diagram of the modified control structure illustrated in FIG. 6.

With particular reference to the figures of the drawings, one embodiment of the present invention will be considered in detail.

Figure 1:
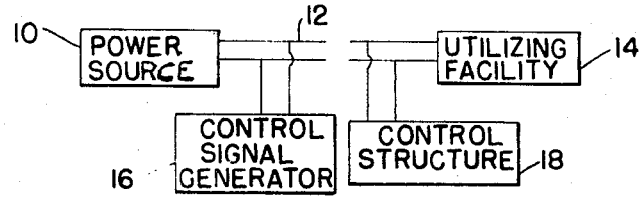
FIG. 1 is a block diagram of a power generating and distribution system including means for impressing a control signal on the distribution system and control structure for receiving the control signal and taking a load off the power distribution system in response to the control signal.

The structure of FIG. 1 illustrates a power source 10, such as a generating plant for electrical energy, a distribution system 12 and a single utilizing facility 14. To this basic system there is added in accordance with the above referenced patent application a control signal generator 16 for generating a signal to be impressed on the power signal at the power source and control structure 18 at the utilizing facility for receiving the control signal and performing a control function such as turning off a water heater for a predetermined time at the utilizing facility 14. The present invention is concerned particularly with the control structure 18.

Figure 2:
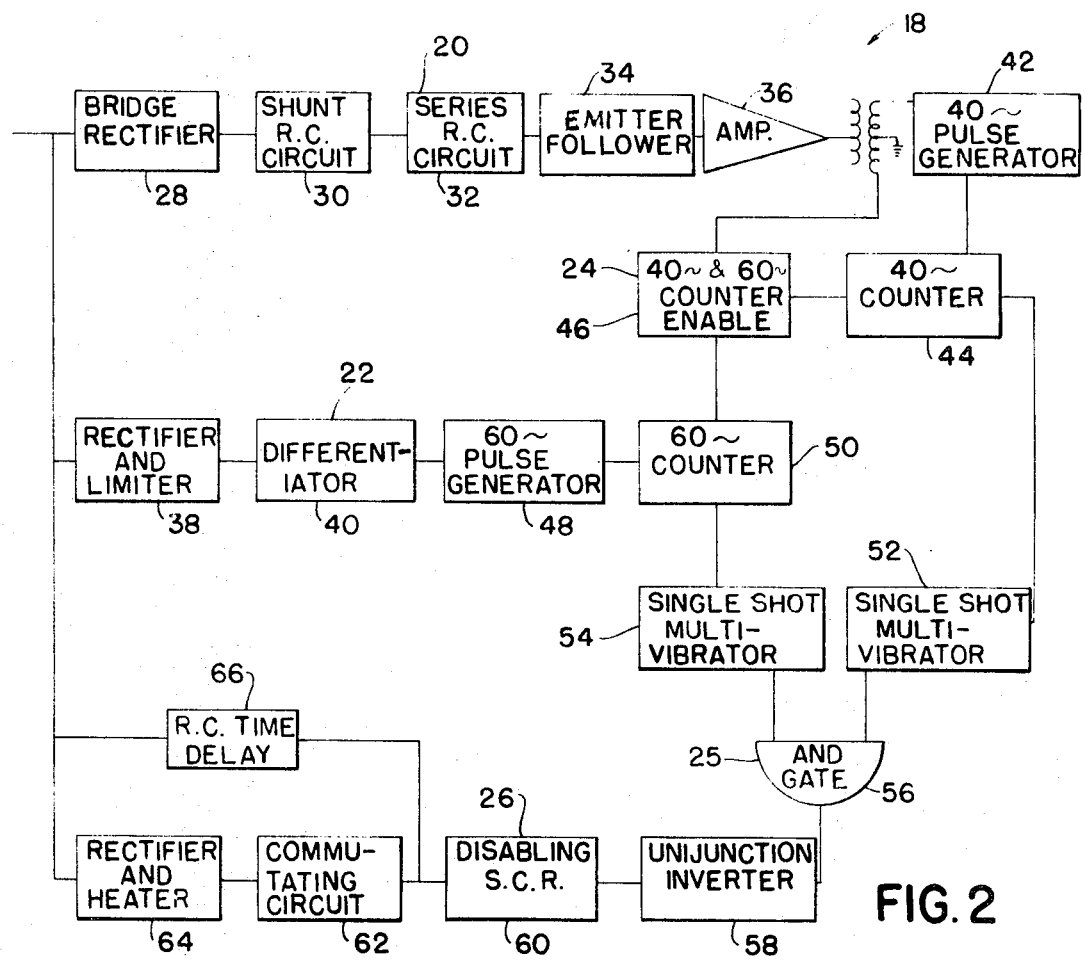
FIG. 2 is a block diagram of control structure for removing a load from a power distribution system for a predetermined length of time in response to a signal from the distribution system constructed in accordance with the invention.

As illustrated in the block diagram of FIG. 2, the control structure 18 includes structure 20 for generating central pulses at a frequency proportional to the frequency of the control signal impressed on the power signal in the distribution system 12 by the generator 16, structure 22 for developing power pulses at a rate proportional to the frequency of the power signal generated by the power source 10, structure 24 for counting the number of control pulses and power pulses in a fixed time and structure 25 for providing an output signal only in response to a predetermined number of control pulses and power pulses occurring in the fixed time. The control structure 18 further includes means 26 responsive to the output signal for removing a utilizing device, such as a hot water heater at the utilizing facility 14 from the distribution system 12 for a predetermined time, and automatically placing the utilizing device placed back in the distribution after the predetermined time.

In the usual electrical power utility in the United States, the power source produces alternating electrical energy at sixty cycles per second. In the present instance it will be assumed that the control signal generator 16 operates to reduce the amplitude of every third cycle of sixty cycle power signal in the distribution system 12.

Figure 3:
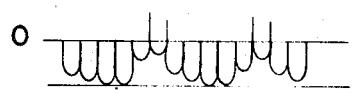
FIGS. 3 and 4 are graphs which aid in the explanation of the control structure illustrated in FIGS. 1 and 5.

In the structure 20 the control signal on the power signal is detected by a bridge rectifier 28 for receiving the power signal having the control signal impressed thereon. The rectifier 28 feeds a shunt resistance capacitance circuit 30 which in turn feeds a series resistance capacitance circuit 32. The output circuit from the bridge rectifier 28 will be a rectified alternating current voltage having two half cycles of every six lower in amplitude. The output of the shunt and series resistance capacitance circuits 30 and 32 will be a similar wave form but with the two lower half cycles displaced with respect to a zero voltage level, as shown in FIG. 3 to provide two relatively sharp spikes extending above the zero voltage level. The emitter-follower 34 is provided to clip the signal illustrated in FIG. 3 to provide the signal illustrated in FIG. 4, whereby two spikes result from every three cycles of the power input signal. The amplifier 36 thus amplifies forty spike signals for every sixty cycles of the power signal. The signal from the amplifier 36 is passed to the forty cycle pulse generator 42 wherein a pulse of constant width and amplitude is produced for each spike to drive the counter 44 of structure 24 when the counter 44 is enabled by the counter enable circuit 46.

The rectifier and limiter 38 and the differentiator 40 of the structure 22 produce sixty spikes per second from a sixty cycle alternating power signal in the usual manner. The sixty cycle pulse generator 48 is provided to generate a constant width and amplitude pulse to drive the counter 50 of structure 24 when the counter 50 is enabled by the counter enable circuit 45.

When forty counts have been registered in the forty cycle counter 44, the single shot multivibrator 52 of structure 25 is actuated to provide an output for a predetermined time. Similarly the single shot multivibrator 54 of structure 25 receives an output signal from the sixty cycle counter 50 after sixty counts have been registered therein. If the forty counts from the counter 44 and the sixty counts from counter 50 occur simultaneously or substantially so, the output signals from the multivibrators 52 and 54 will coincide or overlap to actuate the AND gate 56 to provide an output therefrom.

The output from the AND gate 56 is used to actuate the uni-junction inverter 58 which actuates the disabling silicon controlled rectifier 60 to short circuit the commutating circuit 62 and prevent the commutating circuit 62 from placing the heater across the power supply on every half cycle of the power supply on shorting of the commutating circuit 62. The time delay circuit 66 will prevent the commutating circuit 62 from operating to place the heater across the power supply after the disabling of the silicon controlled rectifier circuit 60 for a predetermined length of time.

Figure 5:
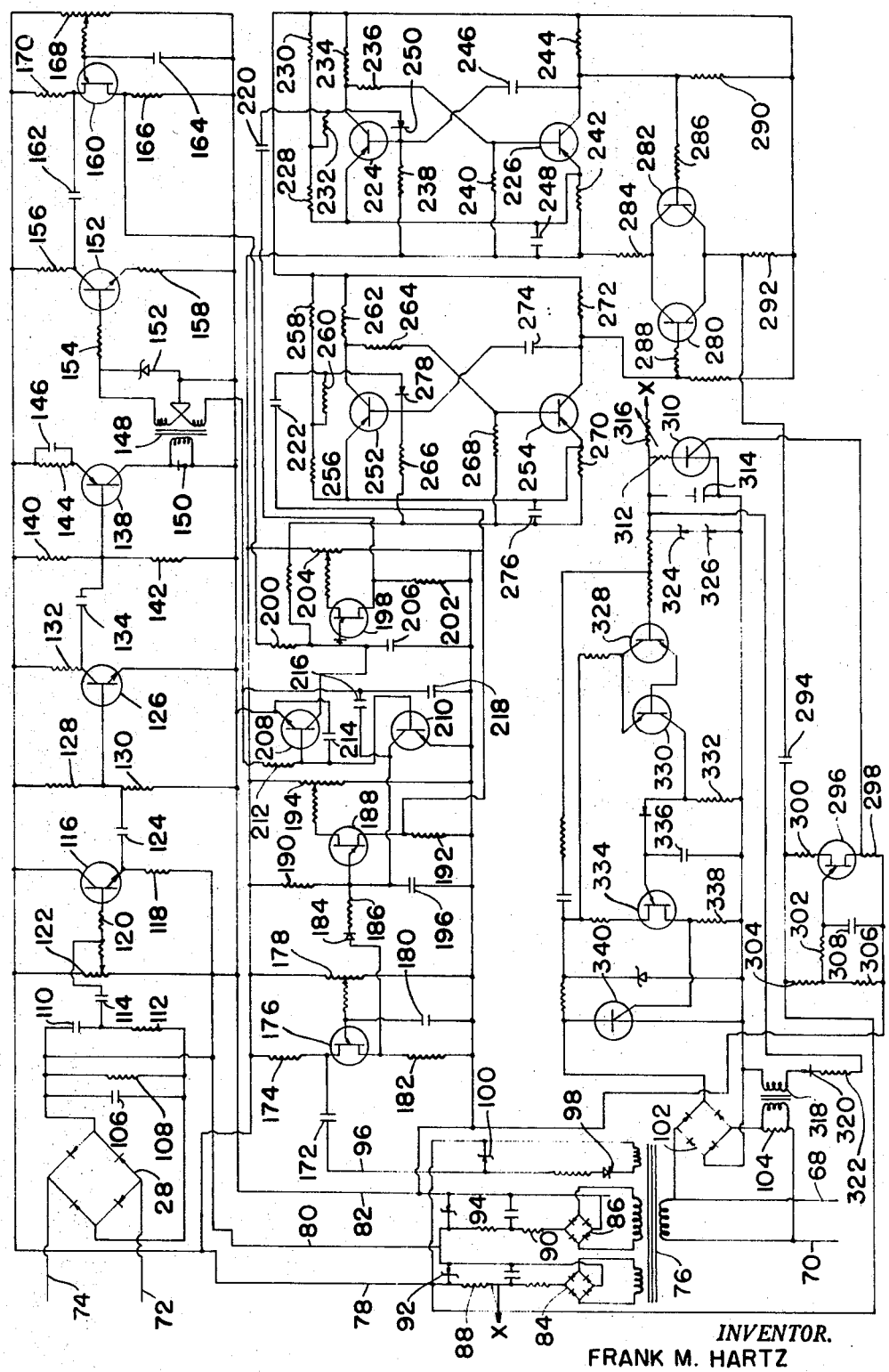
FIG. 5 is a schematic diagram of the control structure illustrated in FIG. 2.

More specifically and referring to FIG. 5 there is received by the control structure 18 over the conductors 68 and 70 and the conductors 72 and 74 the usual sixty cycle one hundred twenty volt alternating power signal from the electrical distribution system 12 having every third cycle decreased in amplitude by the control signal generator 16. The signal from the conductors 68 and 70 is passed through the transformer 76, filter circuits 88 and 90 and voltage regulating Zener diodes 92 and 94 to provide a rectified, filtered and regulated direct current power supply of positive twelve volts on conductor 78, zero volts on conductor 80 and negative twelve volts on conductor 82. The output signal on the conductor 96 is a half-wave rectified signal from diode rectifier 98 which is limited by the Zener diode 100.

The rectifier 102 is placed in series with the heater element 104 of, for example, a hot water heater across the power input conductors 68 and 70. Thus, when the rectifier 102 is shorted, the heater 104 is placed directly across the conductors 68 and 70 from the power distribution system 12 to load the system. As will be seen subsequently, when there is no forty cycle signal impressed on the sixty cycle power signal from the power source 10, the rectifier 102 will be short circuited once every cycle of the input signal, whereby the heater element 104 will be energized to heat water or the like and provide a load on the distribution system 12 to which the conductors 68 and 70 are connected. When the rectifier 102 is not short circuited the heater 104 is energized at a low level and the load on the distribution system 12 is considerably reduced.

Considering now the circuit 20 for sensing the control signal impressed on the usual sixty cycle alternating power signal on the conductors 72 and 74 from the distribution system 12, it will be seen that the rectifier 28 is connected across the capacitor 106 and resistor 108 of the shunt resistance capacitance circuit 30 and that the capacitor 110 and resistor 112 of the series resistance capacitance circuit 32 are provided in series across the output of the rectifier 28. The output signal across the resistor 112 will appear as illustrated in FIG. 3 with the time constant of the series and shunt resistance capacitance 30 and 32 properly chosen.

Thus, for example, with the usual one hundred twenty volt, sixty cycle alternating current provided for home service, with the capacitor 106 having a value of five microfarads and the resistor 108 being a twenty thousand ohm resistor, the signal on the coupling capacitor 114 will be as shown in FIG. 3.

Figure 4:

The signal from the capacitor 114 is impressed on the base circuit of the transistor 116 connected in emitter-follower configuration in conjunction with the resistor 118 and resistor 120 and the variable resistance 122. The resistor 122 is variable to provide signal limiting so that the signal output from the emitter-follower 34 across resistor 118 to coupling capacitor 124 will be as illustrated in FIG. 4. Thus forty spikes per second will be produced by a sixty cycle alternating signal impressed across the rectifier 28.

The signal from the capacitor 124 is passed through the amplifier circuit including the transistor 126 and resistors 128, 130 and 132. The amplified signal from transistor 126 is fed through the coupling capacitor 134 to the base of the power amplifier 138. The power amplifier besides the transistor 138 includes the resistors 140, 142 and 144, the capacitor 146 and the output transformer 148. A protection diode 150 is placed in the circuit of the transistor 138 to prevent damage of the transistor 138 by a back voltage from the transformer 148.

The signals from the transformer 148 are coupled to the pulse generator 42 across the Zener diode 152.

Thus the input to the pulse generator 42 is a regulated voltage so that the output therefrom is a pulse of constant amplitude and width.

The pulse generator 42 includes the transistor 152 and resistors 154, 156 and 158 feeding the uni-junction transistor 160 through the coupling capacitor 162. In operation, on reception of a pulse of energy from the coupling capacitor 162, the uni-junction transistor 160 is caused to conduct to discharge the capacitor 164 thereof through the resistance 166 at a trigger voltage level on capacitor 162 determined by the setting of the variable bias resistor 168 and the value of the resistance 170 to provide an output control pulse across the resistor 166 to the forty cycle counter 44.

Simultaneously with the input signal on conductors 72 and 74 from the power distribution system 13, the alternating sixty cycle input signal is felt at the transformer 76 over conductors 68 and 70 whereby a rectified and limited signal is provided across the differentiating capacitor 172. The signal from the differentiator 40 including the capacitor 172 and resistor 174 will cause the uni-junction transistor 176 to fire in accordance with the bias applied thereto through the variable resistance 178. The capacitor 180 is thus caused to discharge through the uni-junction transistor 176 across the resistance 182 to provide sixty output pulses of constant amplitude and width per second across the diode 184 and resistor 186 to the sixty cycle counter 50.

The sixty cycle counter 50 of counting structure 25 includes the uni-junction transistor 188, resistor 190, resistor 192, variable resistance 194 and capacitor 196. The forty cycle counter includes the uni-junction transistor 198, resistors 200 and 202, and variable resistance 204, along with capacitor 206. The forty and sixty cycle counters are biased to count only when enabled by the counter enable circuit 46. Counter enable circuit 46 includes the transistors 208 and 210, the resistor 212 and capacitors 214, 216 and 218.

In operation the transistors 208 and 210 conduct to permit discharging of the capacitors 206 and 196 in the ramp counters 44 and 50 respectively when a forty cycle signal is present at the transformer 148 for a very short but predetermined time which eliminates spurious signal actuation of the counter enable circuit 46. The capacitor 218 is initially charged so that the transistors 208 and 210 are cut off due to the bias applied thereto through the resistor 212. After the transistors 208 and 210 conduct to discharge capacitors 206 and 196, the pulses from the pulse generator 42 and the pulses from the pulse generator 48 are counted from the same initial time base on the counters 44 and 50.

The forty cycle ramp counter 44 is set by means of the variable resistor 204 to provide an output pulse through coupling capacitor 220 to the single shot multivibrator 52 after forty pulses are received thereby from the pulse generator 48. After sixty pulses are received from the pulse generator 48, the sixty cycle counter 50 will provide an output signal through coupling capacitor 222 to single shot multivibrator 54.

The single shot multivibrator 52 includes the transistors 224 and 226, resistors 228, 230, 232, 234, 236, 238, 240, 242 and 244, capacitors 246 and 248 and protection diode 250 connected in a normal single shot multivibrator circuit, as shown in FIG. 5. Thus, a pulsed output is provided across the output load resistor 244 having a predetermined width for each pulsed input through the coupling capacitor 220.

The single shot multivibrator 54 is similarly conventional and includes the transistors 252 and 254, resistors 256, 258, 260, 262, 264, 266, 268, 270 and 272, capacitors 274 and 276 and protection diode 278. Thus an output pulse having a predetermined width is provided across the load resistor 272 at the end of sixty cycles of the alternating electrical power signal from the distribution system 12.

The output of the multivibrators 52 and 54 are passed into the AND gate 56 including the transistors 280 and 282 resistors 284, 286, 288, 290 and 292 connected as shown in FIG. 5. Providing the forty count from the forty cycle counter 44 and the sixty count from the sixty cycle counter 50 occur substantially simultaneously, that is within the pulse width of the multivibrators 52 and 54 of each other, so that the signals provided to the AND gate 56 coincide, a signal output will be provided through the coupling capacitor 294 to the uni-junction inverter 58.

Thus the uni-junction inverter 58 is energized only when an exact number of control signals are sensed by the control structure 18 in a fixed time which time is determined by the cyclic occurrence of the usual sixty cycle power signal. Spurious signals which might occur in the power distribution system 12 will not therefore actuate the uni-junction inverter.

The uni-junction inverter 58 includes the uni-junction transistor 296, resistors 298, 300, 302, 304 and 306, along with the capacitor 308. Each time a signal is provided to the uni-junction transistor 296 through coupling capacitor 294, the transistor 296 is caused to fire whereby the capacitor 308 is discharged through the resistor 298 to provide an actuating signal across the resistor 298. The signal across the resistor 298 causes the silicon controlled rectifier 310, which together with the resistor 312 forms the disabling silicon controlled rectifier circuit 60, to conduct.

Conduction of the silicon controlled rectifier 310 will discharge the capacitor 314 and thereby prevent the commutating circuit 62 from shorting out the rectifier 102 to place the line voltage from the conductors 68 and 70 directly across the heater element 104 whereby the heater load is removed from the distribution system 12. The commutating circuit 62 will be prevented from shorting the rectifier circuit 102 for a period of time determined by the time constant of the capacitor 314 and adjustable resistor 316 which together form the resistance capacitance time delay circuit 66.

After a delay of, for example, up to thirty minutes variable in accordance with the setting of the resistor 316, if the capactance 314 has not again been discharged by a signal from the uni-junction inverter 58, indicating that additional time delay in placing the heater load back in the distribution system is required, the capacitor 314 will be charged to the point where the commutating circuit will again function to short the rectifier 102 periodically in accordance with the frequency of the input signal over the conductors 68 and 70 to place the heater load back in the distribution system 12.

The commutating circuit 62 is a known item and is described in the third edition of the General Electric Company's Silicon Control Rectifier Manual. As indicated above it functions to short circuit the output of the rectifier 102 at a rate equal to the frequency of the signal input thereto from the transformer 318 connected across the heater element 104 when the capacitor 314 has above a predetermined charge thereon.

Briefly on every half cycle of the electrical signal from transformer 318, as rectified through diode 320 and limited through resistor 322, a voltage regulated by Zener diodes 324 and 326 is applied to the transistors 328 and 330. The transistors are thus caused to conduct through resistor 332 and provide a bias on the uni-junction transistor 334 to cause firing of the uni-junction transistor 338 to provide an actuating signal to the silicon controlled rectifier 340 which conducts to short the rectifier 102. With the capacitor 314 discharged, the transistors 328 and 330 are biased to cut off so that the uni-junction transistor 334 will not be fired and the silicon rectifier 340 will not conduct.

Thus in overall operation when it is desired to remove a load from a power distribution system 12, as exemplified by the water heater element 104, at a utilizing facility 14 having a control structure 18, the control signal generator 16, as for example disclosed in the above referenced patent application, is energized at the power source 10 to lower the voltage on every third cycle of the sixty power signal from power source 10 a slight amount for a short period of for example four or five seconds.

The twenty cycle signal impressed on the power distribution system 12 will after passing through the rectifier 128, shunt resistance capacitance circuit 30 and series resistance capacitance circuit 32 provide a signal at the emitter-follower limiter 34, as illustrated in FIG. 3, and after passing through the emitter-follower 34 the signal will be as illustrated in FIG. 4, whereby forty spikes per second will be amplified through the amplifier 36. Each of the forty spikes from the amplifier 36 will produce a pulse of constant width and amplitude through the pulse generator 42 which will be passed to the forty cycle counter 44.

Simultaneously and even if no twenty cycle signal is impressed on the distribution system 12, the sixty cycle variation in the usual electrical power signal will be passed through transformer 76, rectified through diode 98, limited through Zener diode 100 and differentiated through capacitor 172 to actuate the sixty cycle pulse generator 48, the output from which is a signal having constant amplitude and width which is continually fed to the sixty cycle counter 50.

In accordance with the pulses from the forty cycle pulse generator, the capacitor 206 will actuate the counter enable circuit 46 after a very few pulses from the pulse generator 42 to start the forty cycle counter and sixty cycle counter 42 and 50 counting at the same time. When forty counts have been counted by the forty cycle counter 44 and sixty counts have been counted by the sixty cycle counter 50, the multivibrators 52 and 54 are actuated. If the multivibrators are actuated simultaneously or substantially so so that the output signals therefrom overlap, an output signal will be provided from the AND gate 56.

It will be understood that overlapping of the output signals from the multivibrators 52 and 54 will indicate that forty counts have been recorded in the counter 44 in the same time that sixty counts have been recorded in the counter 50, signifying that the signal causing the forty cycle counter to count is actually the signal impressed on the power distribution system by the control signal generator 16. To prevent interference from equipment, such as stitch welders in the distribution system 12 any selected number of counts may be set to fire the multivibrator 52 simultaneously with the multivibrator 54.

An output signal from the AND gate 56 indicates that a signal has been received requesting the heater 104, which has previously been placed as a load on the distribution system 12 due to shorting of the rectifier 102 by the commutating circuit 62 on every half cycle of the sixty cycle input power frequency, be taken out of the distribution system 12 for a predetermined time.

The signal from the AND gate 56 will cause the unijunction inverter 58 to fire which in turn causes the disabling silicon controlled rectifier circuit 60 to conduct and discharge the capacitor 312 of the time delay circuit 66. Discharging of the capacitor 314 will prevent the commutating circuit 62 from periodic shorting of the rectifier 102 whereby the heater element 104 will be removed from the distribution system 12.

Some time, determined by the resistance capacitance time delay circuit 66, after the last signal is received from the AND gate 56, the heater element 104 is placed back in the power distribution system 12 as a load thereon due to the commutating circuit 62 returning to its usual operation on charging of capacitor 314.

In the modified receiver structure of FIG. 6, the rectifier circuit 28, shunt resistance capacitance circuit 30, series resistance capacitance circuit 32, emitter-follower 34 and amplifier 36 and transformer 148 are substantially the same as in the receiver 18 and are therefore given the same reference numerals. The output of the transformer 148 is however used to actuate a silicon controlled rectifier 344 which is in parallel with a capacitor 346. The capacitor 346 is in series with the actuating coil 348 of a resonant reed relay 350, including the reed contact 352. The reed relay 350 is set to resonate at forty cycles so that it will close when the forty pulses per second are received by the receiver 342. Closing of the reed relay 350 will actuate the power relay 352 to take the water heater 354 out of the distribution system 12. The time delay 356 is provided to place the heater 354 back in the distribution system 12 at the end of a predetermined time. Thus, with the arrangement of FIG. 6, it will be understood that the entire power supply current may be provided for charging the capacitance 346 whereby a large amount of current will be present to actuate the reed relay 350.

More specifically, as shown in FIG. 7, the power relay 352 includes an actuating coil 358 connected in series with the power source across the conductors 360 and 362 with the resonant reed relay 350 closed. With the coil 358 not energized the contacts 364 and 366 of the power relay 352 are connected as shown in FIG. 7 whereby the heater conductors 368 and 370 are placed directly across the power input lines 360 and 362. The time delay coil 372 is energized to open the switch 374. When the reed relay 350 closes and coil 358 is energized, the contacts 364 and 366 assume an upper position. The heater circuit is thus broken and current will flow through the coil 358 in the opposite direction to close the switch 374 whereby the coil 358 is maintained energized for a time dependent on the setting of the resistor 378 and the charging of the capacitor 380. After a predetermined time during which the heater conductor 370 has been deenergized the switch 374 will open to again place the heater back in the distribution system 12 providing the resonant relay 350 is now open.

While one embodiment and a modification of the invention have been disclosed in detail, it will be understood that other embodiments and modifications thereof are contemplated by the inventor. Thus, it would for example be possible to use more expensive but more accurate digital counters in the receiver 18, thus permitting taking of the load off of the distribution system at any desired count to completely do away with possible interference by spurious signals having the same count as the control signal. The multivibrators 52 and 54 could also be eliminated with the use of digital counters instead of the ramp counters 44 and 50. Also, it will be understood that while a water heater circuit has been used as an example, remote control of other elements in a distribution system can be effected by the disclosed structure, such as pole top switches. It is the intention to include all embodiments and modifications as are defined by the appended claims within the scope of the invention.

What I claim as my invention is:

1. Structure for effecting remote control of a device at a remote location by control signals impressed on an alternating power signal in an electrical distribution system comprising means at the remote location for counting the control signals received in a predetermined time, means for counting the cycles of the alternating power signal received in the predetermined time, and means responsive to simultaneous occurrence of a predetermined number of counts of the control signal and cycles of the power signal in the predetermined time for removing a load from the electrical distribution system.

2. Structure for effecting remote control of a device at a remote location by control signals impressed on an alternating power signal in an electrical distribution system comprising means for sensing the control signals impressed on an alternating power signal in the electrical distribution system, a counter for counting the number of control signals received at the remote location in a predetermined time, a counter for counting the number of alternations in a predetermined time in the alternating power signal at the remote location, structure operably associated with the counters for starting counting the control signals and the alternations of the power signal at the same time, and means connected to the counters for effecting a control operation when both counters register predetermined counts in the predetermined time.

3. Structure as set forth in claim 2 wherein the means for effecting a control operation includes a pair of single shot multivibrators respectively connected to the counters and feeding an AND gate, a rectifier in series with a load circuit positioned across the distribution system, means for cyclically shorting the rectifier to place the power signal across the load circuit when no signal is provided from the AND gate and means for preventing short circuiting of the rectifier for a predetermined time on occurrence of a signal from the AND gate.

4. Structure as set forth in claim 2 wherein the means for sensing the control signals includes a bridge rectifier, and a shunt resistance capacitance circuit and a series resistance capacitance circuit connected aross the output of the rectifier.

5. The method of remote control of a device at a remote location through control signals impressed on an alternating power signal at a source location comprising counting the number of control signals on the power signal in a predetermined time at the remote location, counting the alternations of the power signal during the predetermined time at the remote location and providing a separate output signal in response to a predetermined number of counts of each of the control signal and power signal in the predetermined time and effecting control of the device on simultaneous occurrence of the separate output signals.

6. The method as set forth in claim 5 wherein the control of the device at the remote location is maintained for a predetermined length of time.

References Cited
UNITED STATES PATENTS

| | | | |
|---|---|---|---|
| 2,534,144 | 12/1950 | Price et al. | 307—140 |
| 2,745,991 | 5/1956 | Seymour | 307—140 |
| 3,088,099 | 4/1963 | Duvall | 340—169 |
| 3,365,654 | 1/1968 | Johnston | 219—501 |

ROBERT K. SCHAEFER, Primary Examiner

D. SMITH, JR., Assistant Examiner

U.S. Cl. X.R.

219—497; 307—96, 140; 340—168, 169